F. V. ROESEL & C. H. FRANKS.
CORE FOR RESILIENT WHEEL TIRES.
APPLICATION FILED AUG. 15, 1913.
1,183,121. Patented May 16, 1916.
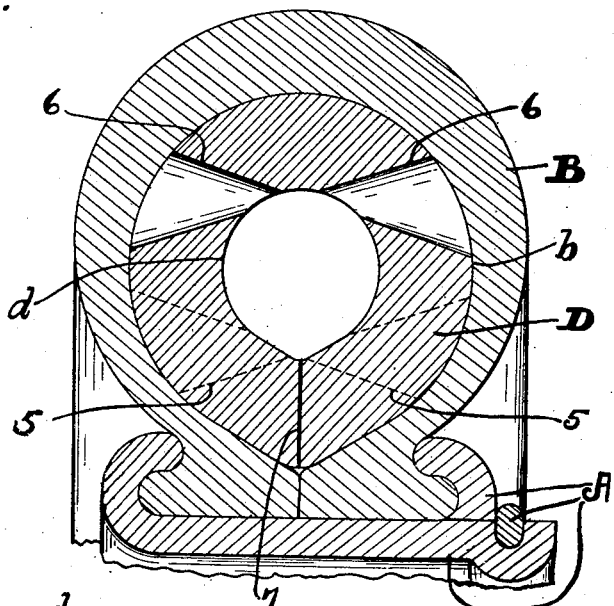
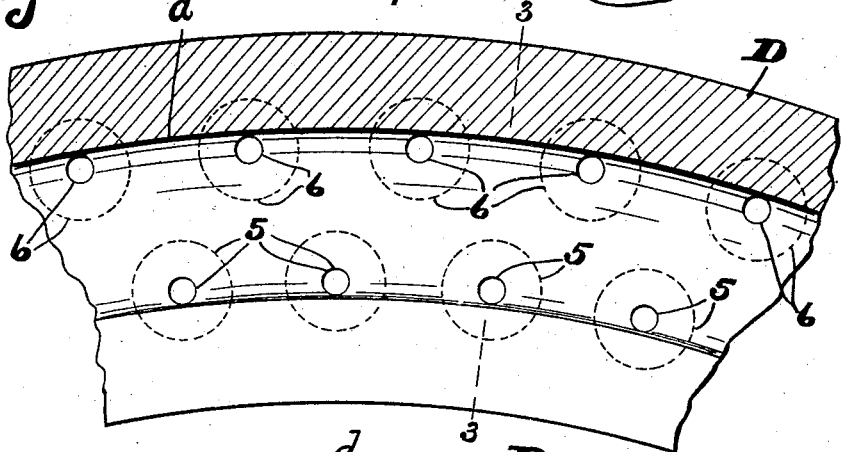
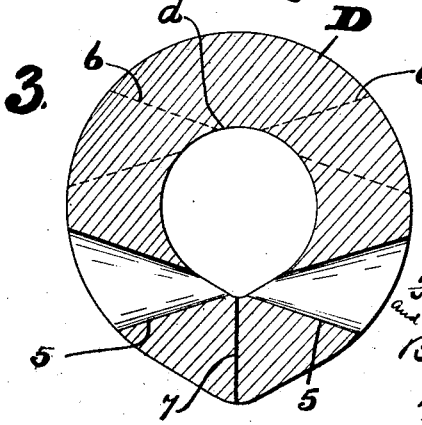
Witnesses:
H. J. Gettins
B. C. Brown
Inventors
Frederick V. Roesel
and Charles H. Franks
By
their Attorneys

UNITED STATES PATENT OFFICE.

FREDERICK V. ROESEL AND CHARLES H. FRANKS, OF AKRON, OHIO.

CORE FOR RESILIENT WHEEL-TIRES.

1,183,121.  Specification of Letters Patent.  Patented May 16, 1916.

Application filed August 15, 1913. Serial No. 784,900.

*To all whom it may concern:*

Be it known that we, FREDERICK V. ROESEL and CHARLES H. FRANKS, citizens of the United States of America, residing at Akron, in the county of Summit, State of Ohio, have invented a certain new and useful Improvement in Cores for Resilient Wheel-Tires; and we do hereby declare the following to be a full, clear, and exact description of the invention, such as will enable others skilled in the art to which it pertains to make and use the same.

This invention relates to improvements in cores for resilient wheel-tires, and pertains more especially to a core comprising an elastic and compressible non-inflatable annular body which is provided centrally with an annular chamber arranged concentrically relative to the axis of the core and is furthermore provided in each side thereof with apertures which are spaced circumferentially of said axis and extend laterally from said chamber to the exterior of the core.

One object of this invention is to render a tubular and elastic and compressible tire-core not only adequately strong to render it non-collapsible when the tire comprising said core is mounted on a wheel-rim, but to have said core highly resilient circumferentially and from side to side of the core.

Another object is not only to prevent the core from being unduly flabby, but to have the core uniform in resiliency circumferentially and from side to side of the core.

Another object is to provide a core of the character indicated which can be made with facility and inexpensively.

With these objects in view, and to the end of attaining any other advantage hereinafter appearing, this invention consists in certain peculiarities of construction hereinafter described, pointed out in the claims, and illustrated in the accompanying drawings.

In said drawings, Figure 1 is a cross-sectional view of a tire provided with a core embodying our invention and shows the tire applied to a tire-holder. Fig. 2 is a side view of a portion of our improved annular core in central section. Fig. 3 is a transverse section on line 3—3, Fig. 2.

Referring to said drawings, A, Fig. 1, indicates a tire-holder which is of course made annular to render it capable of being mounted on a wheel-rim (not shown), and B represents the hollow casing of a tire, which casing is substantially the same as the casing of an ordinary pneumatic tire and consequently composed of flexible and elastic material, such, for instance, as rubber. The casing B extends of course circumferentially of the tire-holder A and is provided interiorly with an annular chamber $b$ extending circumferentially of said tire-holder, and within said chamber is our improved flexible core which comprises an elastic and compressible non-inflatable annular body D which extends therefore, circumferentially of the tire-holder and is separately illustrated in Figs. 2 and 3. The annular body D is composed of any suitable elastic and compressible material, such, for instance, as rubber, and extends circumferentially of and is arranged concentrically relative to the axis of the core. The body D is provided centrally with an annular chamber $d$ extending circumferentially of and arranged concentrically relative to the axis of the core. The walls of the chamber $d$ measure in thickness considerably less than the diameter of said chamber, but to render our improved core strong enough to prevent it from collapsing in a tire applied to a vehicle-rim, as shown in Fig. 1, by undue pressure on the tire, said walls measure in thickness more than one-half of said diameter so as to positively prevent the core from being unduly flabby.

The body D is shown provided in each side thereof with two rows of apertures, which rows are spaced transversely of said side, and each aperture of each row of apertures extends from the chamber $d$ laterally and outwardly in a substantially horizontal plane to the exterior of the core. Each aperture in each side of the core has its inner extremity arranged substantially midway between the sides of the core. Each aperture 5 of the inner row of apertures in each side of the core is substantially in line endwise with an aperture of the inner row of apertures in the other side of the core, and each aperture 6 of the outer row of apertures in each side of the core is substantially in line endwise with an aperture in the outer row of apertures in the other side of the core so that both sides of the core are uniformly as well as adequately resilient.

The apertures of each row of apertures in each side of the core alternate with the apertures of the other row of apertures in said side of the core. Preferably each aperture is circular in end view and much larger in diameter at its outer end than at the inner end of the aperture but gradually enlarged in diameter from the chamber $d$ to the exterior of the core. The apertures 5 and 6 flare therefore toward the exterior of the core.

A tire-core having an internal chamber $d$ and apertures 5 and 6 which are relatively arranged and shaped as hereinbefore described is not only highly resilient, but possesses a resiliency which is substantially uniform from side to side and circumferentially of the core, and said core has enough strength at the sides of said chamber to prevent the core from being unduly flabby. To facilitate the manufacture of the core and afford access to the chamber $d$ of the core for cleaning and repairs the inner portion of the body is split and consequently separable, as at 7, circumferentially between the inner rows of apertures from the chamber $d$ to the exterior of the core, and to attain the maximum resiliency possible in our improved core the apertures 5 and 6 are not only gradually enlarged in diameter from the said chamber to the exterior of the core, as hereinbefore indicated, but the apertures of the inner rows of apertures in each side of the core communicate with the chamber $d$ in proximity to the line of separation of the inner portion of the body D and the apertures of the outer row of apertures in each side of the core communicate with said chamber at the outer surrounding wall of the chamber.

More especially important, in order to render the core adequately resilient at the surrounding wall of the chamber $d$ and from said wall horizontally to the exterior of the core at the sides of the core, is the extension of the last-mentioned apertures in a substantially horizontal plane between the chamber $d$ at said wall and the exterior of the core, and not unimportant also, to attain the maximum resiliency, is the extension of each aperture of the inner row of apertures in each side of the core from a point opposite the said wall laterally and outwardly in a substantially horizontal plane to the exterior of the core, and the arrangement of the inner extremity of each aperture in each side of the core centrally between the sides of the core.

What we claim is:—

1. A flexible core for a resilient wheel-tire, which core comprises an elastic and compressible non-inflatable annular body having a central chamber and provided in each side thereof with two rows of laterally extending apertures arranged substantially horizontally between said chamber and the exterior of the core, the apertures of each of said rows being substantially parallel with the apertures of the other of said rows.

2. A flexible core for a resilient wheel-tire, which core comprises an elastic and compressible non-inflatable annular body having a central chamber and provided in each side thereof with a row of laterally extending apertures each of which is arranged horizontally between said chamber and the exterior of the core and in line endwise with an aperture in the opposite side of the core.

3. A flexible core for a resilient wheel-tire, which core comprises an elastic and compressible non-inflatable annular body having a central chamber and provided in each side thereof with two rows of lateral apertures, which rows are spaced radially of said side, each aperture of each row of apertures in each side of the core being arranged substantially horizontally between said chamber and the exterior of the core and enlarged toward said exterior.

In testimony whereof, we sign the foregoing specification, in the presence of two witnesses.

FREDERICK V. ROESEL.
CHARLES H. FRANKS.

Witnesses:
B. C. Brown,
N. L. McDonnell.

Copies of this patent may be obtained for five cents each, by addressing the "Commissioner of Patents, Washington, D. C."